United States Patent

[11] 3,622,418

[72] Inventors William Horace Black
3060 Pharr Court N.W., Atlanta, Ga. 30317;
Clarence Edward Pittman, 2479 Peachtree Road N.E., Atlanta, Ga. 30305
[21] Appl. No. 48,899
[22] Filed June 16, 1970
[45] Patented Nov. 23, 1971
Original application Dec. 27, 1966, Ser. No. 604,717, now Patent No. 3,462,208, Continuation of application Ser. No. 834,352, June 18, 1969, now abandoned. Divided and this application June 16, 1970, Ser. No. 48,899

[54] DRAWER MANUFACTURING METHOD
5 Claims, 11 Drawing Figs.
[52] U.S. Cl. .................................................. 156/217,
93/49 M, 156/209, 156/219, 264/151, 264/210, 264/295, 264/339
[51] Int. Cl. ........................................................ B29c 17/02, B29d 15/00
[50] Field of Search .......................................... 264/151; 264/160, 163, 132, 210, 294–298, 339; 156/217, 209, 219

[56] References Cited
UNITED STATES PATENTS

| | | | |
|---|---|---|---|
| 2,589,022 | 3/1952 | Page .............................. | 18/19 |
| 2,973,697 | 3/1961 | Lerner ........................... | 93/35 |
| 3,051,605 | 8/1962 | Stannard ....................... | 264/210 X |
| 3,141,913 | 7/1964 | Edwards ........................ | 264/210 |
| 3,148,103 | 9/1964 | Gallagher ...................... | 264/160 X |
| 3,268,637 | 9/1966 | Cremer ......................... | 264/296 X |
| 3,286,902 | 11/1966 | Hunter .......................... | 229/2.5 |
| 3,454,694 | 7/1969 | Delaire .......................... | 264/151 |

Primary Examiner—Robert F. White
Assistant Examiner—Richard R. Kucia
Attorney—Newton, Hopkins & Ormsby ABSTRACT: Method of producing drawer forms by extruding a sheet of plastic, the edges of which are notches at spaced intervals with substantially rectangular open sided opposed pairs of notches; the sheet is then successively cut transversely between each pair of notches to provide drawer blanks, the edge portions of which are bent from the plane of the bottom, and abutting side and back edges are welded together. In the method, calendering rollers produced reinforcing ribs on one of the plastic surfaces and a wood grain effect on the other.

PATENTED NOV 23 1971 3,622,418

INVENTORS
WILLIAM HORACE BLACK
CLARENCE EDWARD PITTMAN
BY Newton, Hopkins,
& Ormsby
ATTORNEYS INVENTORS
WILLIAM HORACE BLACK
CLARENCE EDWARD PITTMAN
BY Newton, Hopkins,
& Ormsby
ATTORNEYS

PATENTED NOV 23 1971 3,622,418

INVENTORS
WILLIAM HORACE BLACK
CLARENCE EDWARD PITTMAN
BY Newton, Hopkins,
& Ormsby
ATTORNEYS

DRAWER MANUFACTURING METHOD

CROSS-REFERENCE TO RELATED APPLICATIONS

This application is a division of our copending application Ser. No. 604,717; Filed Dec. 27, 1966; For "Drawer and Method of Manufacturing the Same" now U.S. Pat. No. 3,462,208.

BACKGROUND OF THE INVENTION

This invention relates to a method of manufacturing a drawer form and is more particularly concerned with a low cost plastic drawer form, the blank from which the drawer form is fabricated and the method of fabricating the drawer forms successively from an extruded sheet of plastic.

In the past, prefabricated plastic drawers have been produced by injection molding. Injection molding dies, especially of a suitable size to form drawers, are extraordinarily expensive and the individual cavities of such dies are incapable of being varied for creating drawers of different dimensions. Therefore, for each size and shape of drawer, a mold cavity must be provided for creating such a drawer.

In addition to the expense of tooling therefor, the prior art plastic drawers are relatively expensive from a raw materials standpoint in that the walls and bottom of such drawers must be quite thick and bulky. The prior art plastic drawers also do not nest well and therefore, while being relatively light, when compared to wooden drawers, occupy considerable amount of space for shipping and storing.

Other prior art plastic drawers have been vacuum formed; however, here again a relatively heavy drawer of prescribed dimensions is formed by a specific die.

The furniture industry consumes a vast quantity of drawers and the designs of furniture change quite rapidly with emphasis being placed on the outward appearance of such articles, rather than adhering the designs to particular sizes and shapes. Therefore, while there has existed for many years a quite acute need for a truly inexpensive yet durable, drawer and method of readily producing drawers of varying dimensions, no one heretofore, to the best of our knowledge, has devised a drawer or a method of producing a drawer, which will meet this demand.

The drawer form and method of manufacturing the same of the present invention overcome the disadvantages disclosed above and tend to solve the problem of providing a variety of shapes and sizes of drawers, even when short runs of a particular drawer are involved.

SUMMARY OF THE INVENTION

Consequently, it is among the objects of this invention to provide a drawer form which is light in weight and inexpensive in cost, but rigid and durable in construction.

Another object of the invention is to provide a plastic drawer form which may be nested within other similar drawer forms, creating thereby a compact shipping arrangement.

A further object of the invention is to provide a drawer form which may be readily and easily joined to anyone of a variety of drawer fronts to form a plastic drawer.

Another object of the invention is to provide a plastic drawer form which may be easily translated in and out of a drawer opening.

Another object of the invention resides in the provision of a plastic drawer form which removes the need for additional drawer hardware such as center drawer guides and drawer suspension systems.

Another object of the present invention is to provide a plastic drawer blank which is inexpensive to manufacture, may be shipped in a flat condition to an assembly point, may be completed into a drawer form utilizing few tools, and which, when completed, with a drawer front, provides an inexpensive durable drawer.

Another object of the present invention is to provide a method of producing a drawer form which will permit a wide variety of shapes and sizes of drawer forms to be produced quite rapidly with inexpensive equipment and at low cost.

Another object of the invention is to provide a method of producing drawer forms which lends itself well to both short run and long run production of drawer forms.

Briefly described, the drawer form of the present invention, which achieves these and other purposes, comprises a three-sided open-ended boxlike thermoplastic structure in which the side and backwalls are integrally joined to the bottom along common edges and the upright rear corners which are formed by abutting edges of the sides and back which are bonded together. Reinforcing ribbing integrally formed on the exterior surfaces of the side, bottom and rear walls reduce the overall weight of the drawer form and yet provide a sufficiently rigid structure for extended use. Moreover, the drawer form has sidewalls which taper outwardly, permitting thereby the nesting of one drawer form within another. The side and rear walls of the drawer form terminate in upper outwardly and downwardly extending or inverted U-shaped lips which contribute to the overall rigidity and durability of the entire drawer form.

The process of the present invention includes the steps of extruding a sheet of thermoplastic material such as polystyrene or polyvinyl chloride and moving the sheet as it is extruded along a predetermined path. In a notching zone, opposed pairs of rectangular open ended notches are cut in the edge portion of the sheet at longitudinally evenly spaced intervals. Thereafter, the sheet travels to a cutting zone where a knife successively cuts the sheet transversely between edges of the opposed pair of notches whereby the plastic sheet is cut into successive blanks. Each plastic blank is maintained in a relatively plastic condition and after the blanks are cut off from the main sheet, the end portions and side portions of the blank are folded out of the plane of the plastic sheet for forming the side and back walls of the drawer form. Thereafter, the abutting edges, formed by the notches, are bonded together. In the process, inverted U-shaped outwardly and downwardly protruding lips are produced in the plastic sheet for forming upper runners; also, reinforcing ribs are formed along the outer surface of the sheet for the purpose of reinforcing the resulting structure.

Other objects, features and advantages of the present invention will become apparent from the following description, when taken in conjunction with the accompanying drawings, wherein like characters of reference designate corresponding parts throughout the several views.

DESCRIPTION OF THE ILLUSTRATED EMBODIMENTS

Figure 3:
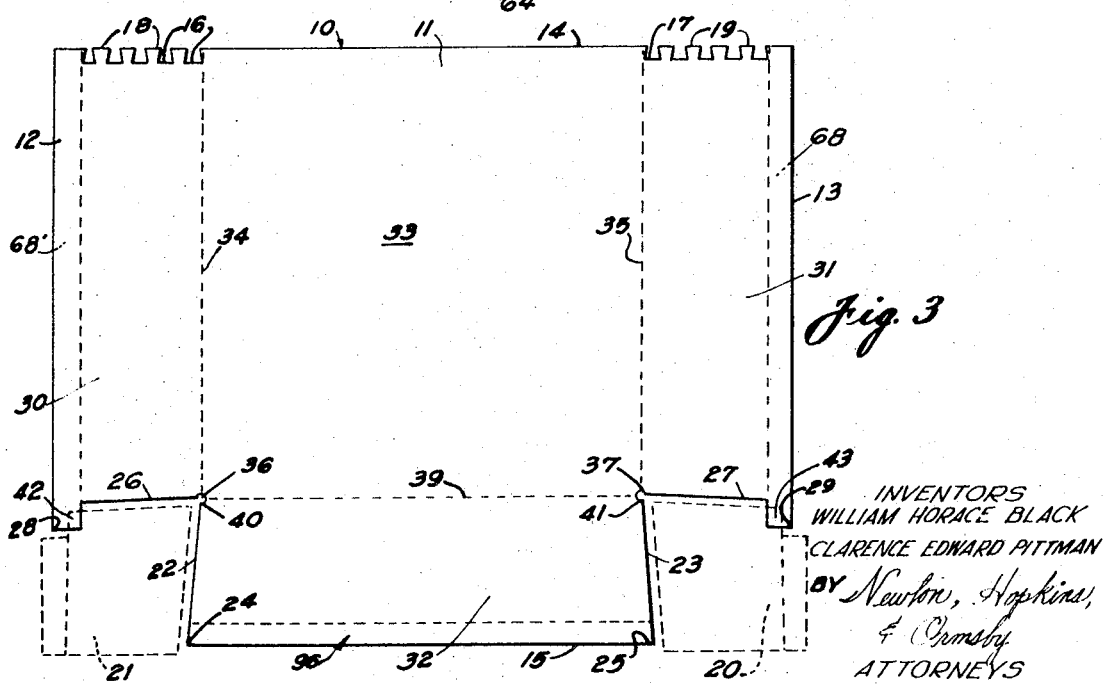
FIG. 3 is a top plan view of a drawer form blank prior to being configured.

Referring specifically to FIG. 3 of the drawing, it will be seen that the drawer form 10 initially comprises a flat generally rectangular unitary plastic drawer blank 11 having opposed parallel side edges 12 and 13, a front edge 14, and a rear edge 15. Front edge 14 is provided with two groups of transversely spaced notches 16 and 17 which define therebetween spaced fingers 18 and 19 of a portion of a dovetail joint. It should be understood, however, that the present invention is not limited to spaced notches and fingers within front edge 14 but also includes a front edge 14 of straight and uninterrupted shape as shown in other figures of the drawings.

Rear corner portions 20 and 21 of blank 11 are removed creating thereby forwardly converging complementary backwall edges 22 and 23 which extend longitudinally from the ends 24 and 25 of rear edge 15 inwardly toward front edge 14. Furthermore, the removal of portions 20 and 21 create sidewall edges 26 and 27 which extend from the rear ends 28 and 29 of the side edges 12 and 13 transversely inwardly toward each other and respectively intersect backwall edges 22 and 23. Backwall edges 22 and 23 are of approximately the same length as sidewall edges 26 and 27.

Provided between sidewall edges 26 and 27 and front edge 14 are a pair of flat sidewalls 30 and 31. Provided between backwall edges 22 and 23 is backwall 32. Sidewalls 30 and 31 are integrally joined to a bottom wall 33 and are deformable upwardly along lines 34 and 35 which are substantially parallel to side edges 12 and 13 and run from front edge 14 to the inward ends 36 and 37 of sidewall edges 26 and 27. Backwall 32 is also integrally joined to bottom wall 33 and is deformable upwardly along line 39 which is substantially parallel to rear edge 15 and runs between the inward ends 40 and 41 of backwall edges 22 and 23.

The outermost portions of sidewall edges 26 and 27 define tab portions 42 and 43 of generally rectangular shape extending rearwardly from sidewalls 30 and 31.

Blank 11 is constructed from a suitable thermoplastic heat softenable material such as polystyrene or polyvinylchloride. These materials are not unduly affected by the application of stress or strain at any one point and are hardenable only upon cooling. Consequently, the materials are particularly suited for use in the manufacture of the drawer form of the present invention.

Figure 1:
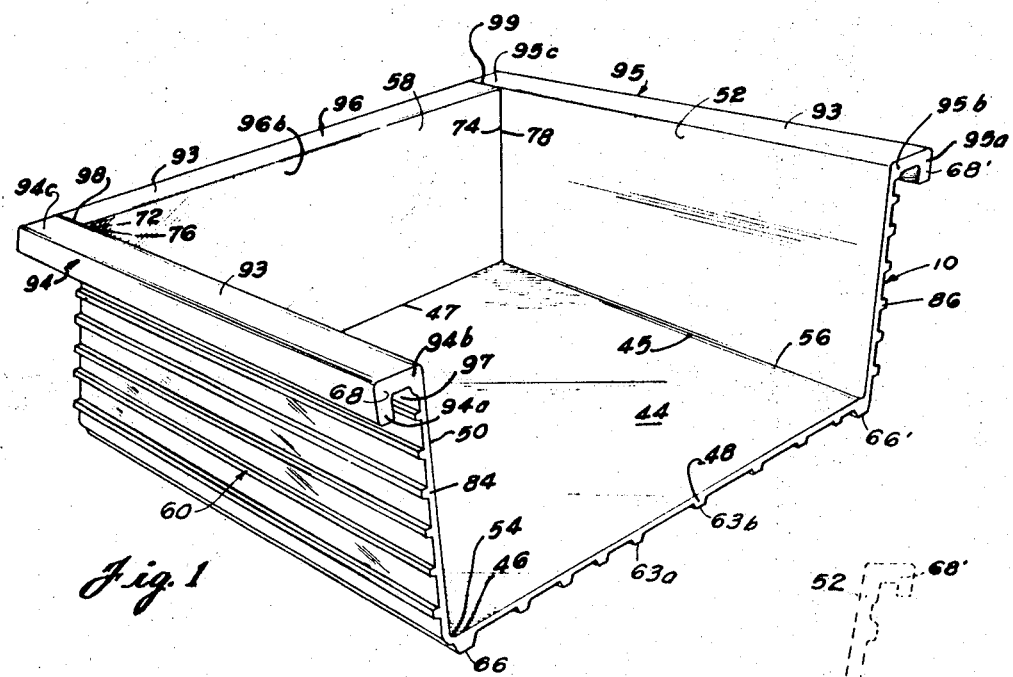
FIG. 1 is a front perspective view of the drawer form of the present invention showing the construction and arrangement of the raised ribs along the exterior surface of the bottom and sides of the drawer.

Referring specifically to FIG. 1 of the drawings, the configured drawer form 10 comprises a substantially boxlike open-ended structure having a generally rectangular flat bottom 44 with opposed parallel side edges 45 and 46, a rear edge 47 and a front edge 48. A pair of spaced opposed upstanding sidewalls 50 and 52 are integrally joined along their bottom edges 54 and 56 to side edges 45 and 46 of bottom 44. An upstanding backwall 58 is integrally joined along its bottom edge 70 to the rear edge 47 of bottom 44.

Figure 6:
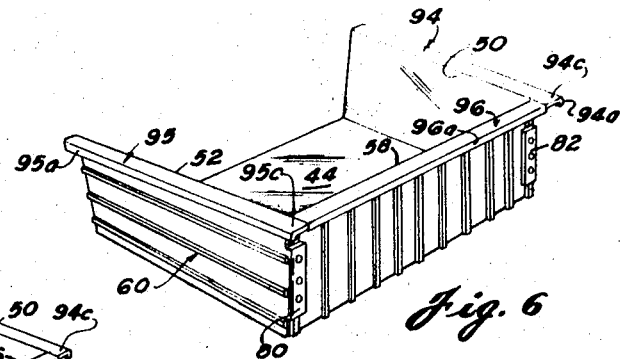
FIG. 6 is a rear perspective view of the drawer form of the present invention showing raised ribs formed in the exterior wall surfaces and a lip overlapping joint between side and rear walls.

Rear wall 58 is provided with a pair of opposed upwardly diverging side edges 72 and 74 which abut the rear edges 76 and 78 of sidewalls 50 and 52 and are heat welded thereto. Other means for joining edges 72 and 74 to edges 76 and 78 include a plastic adhesive placed therebetween and overlapping tongues 80 and 82 extending from sidewall edges 76 and 78 and engaging rear wall 58. Conventional securing means such as staples, brads and screws (not shown) would then be employed to rigidly secure the tongues 80 and 82 to rear wall 58. A tongue overlapping joint such as just described would, of course, be far stronger than the one created by the use of adhesives or heat welding. Tongues 80 and 82 are best shown in FIG. 6.

Figure 7:
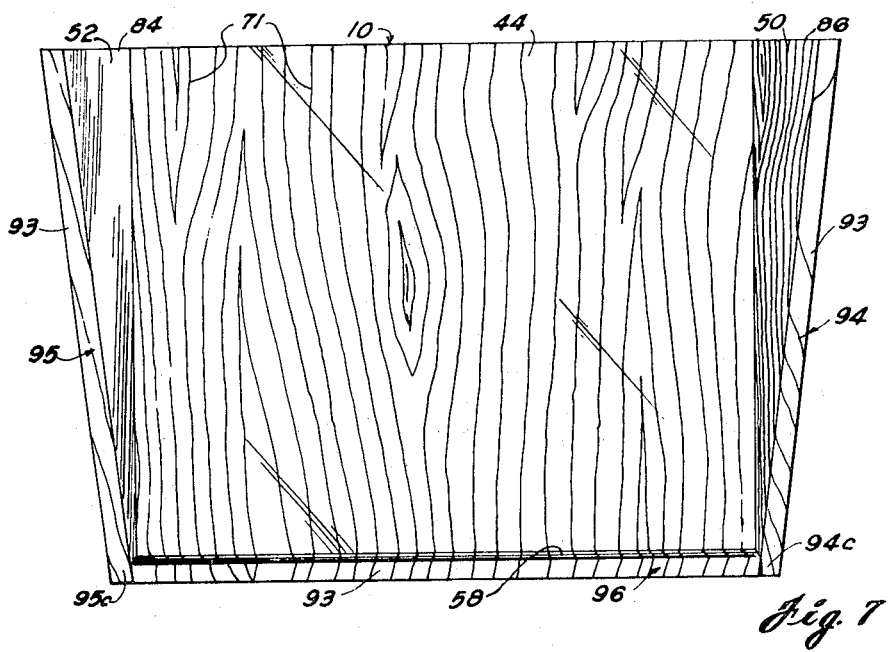
FIG. 7 is a top plan view of a configured drawer form showing the obtuse angular relationship of the side, back and bottom walls.

As seen in FIG. 7 of the drawings, sidewalls 50 and 52 each form an oblique angle with bottom wall 44. At the line of attachment of sidewalls 50 and 52 to backwall 58, the sidewalls form angles of 2° to 4° with bottom wall 44. These angles gradually increase as the sidewalls progress toward the leading edges 84 and 86 of sidewalls 50 and 52 until the angles equal approximately 6° to 10° The drawer form 10 thus has an exaggerated open end facilitating the quick and easy nesting of one drawer form 10 within another.

Figure 11:
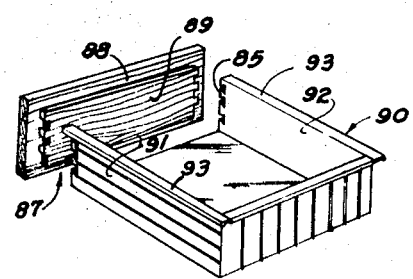
FIG. 11 is a rear perspective view of the drawer form and drawer front spaced from the drawer form for illustrative purposes showing a suitable drawer front properly positioned thereon.

The angle between sidewalls 50 and 52 and bottom wall 44, however, must not be unduly oblique since the drawer forms 10 eventually have a drawer front 88 (FIG. 11) properly positioned thereon. Drawer front 88 preferably includes a central rectangular back protrusion 89 providing a substantially rectangular edge to which the interior surfaces of the front portions of sidewalls 50 and 52 are secured. Front 88 alternatively includes a back groove (not shown) substantially complementary with the sidewall leading edges 84 and 86 and front edge 48 of bottom 44. In addition, outwardly extending fingers 85 of a portion of a dovetail joint 87 are employed as an alternative means for joining front 88 to drawer form 10. If drawer front 88 includes protrusion 89 suitable securing means such as staples are passed through the exterior surface of sidewalls 50 and 52 and into protrusion 89 thereby securing front 88 to drawer form 10.

When sidewall leading edges 84 and 86 are secured to drawer front 88, sidewalls 50 and 52 are positioned in a substantially perpendicular relationship to bottom wall 44. Therefore, the completed drawer 90 has sidewalls 91 and 92 which are substantially perpendicular and provide a top surface 93 which is substantially rectangular.

Figure 4:
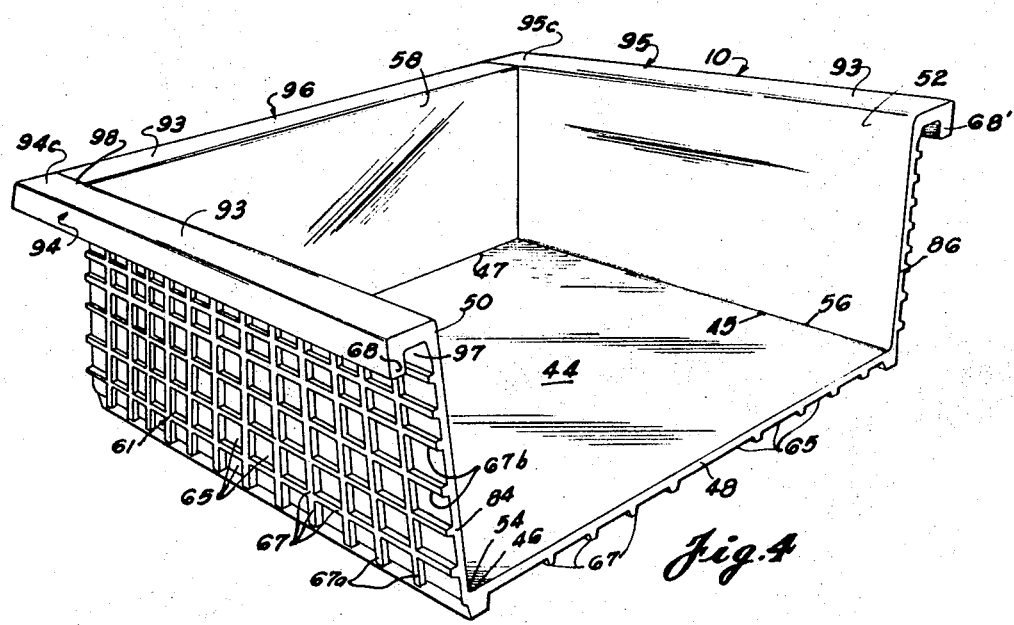
FIG. 4 is a front perspective view of the drawer form of the present invention showing waffled reinforcing ribbing embossed into the exterior surface of the sidewall.

The uppermost portions of the sidewalls 50 and 52 and rear wall 58, shown best in FIGS. 1 and 4, terminate in outwardly extending inverted U-shaped lips 94, 95 and 96, respectively. These lips 94, 95 and 96 are of a thickness greater than that of their corresponding side or back walls and have inner and outer walls 94a, 94b, 95a, 95b, 96a, 96b which define a channel passageway 97 sufficient to permit the accommodation of a drawer runner (not shown) therein. Further, these lips 94, 95 and 96 function to provide each side or back wall with a substantial longitudinal member which is resistant to a warping movement of the wall. In combination with the drawer front 88, the lips 94, 95 and 96 provide an upper surface 93 which contributes to the ultimate rigidity of the completed drawer.

Lips 94 and 95 extend rearwardly from sidewalls 50 and 52 and engage opposing ends 98 and 99 of lip 96. Those portions 94c and 95c of lips 94 and 95 which engage ends 98 and 99 are joined and secured to ends 98 and 99 by heat welding.

Figure 5:
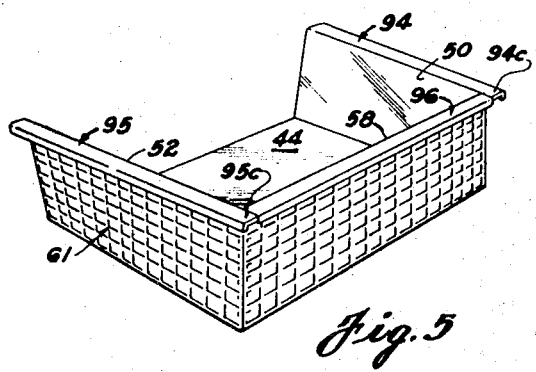
FIG. 5 is a rear perspective view of the drawer form as shown in FIG. 4 showing edge joining of the side and rear walls and further showing waffled reinforcing ribbing embossed in the rear wall.

Further contributing to the rigidity of the drawer form 10 is reinforcing ribbing formed into the exterior surfaces of the side, bottom and back walls. FIGS. 4 and 5 show a waffled reinforcing ribbing 61 composed essentially of a plurality of flat depressed areas 65 separated from each other on all sides by narrow continuous raised ribs 67. These ribs 67 essentially comprise a first series 67a of spaced parallel raised ribs running perpendicular to and intersecting a second series 67b of spaced parallel raised ribs. Ribs 67a and 67b are integrally joined to the exterior surfaces of the side, bottom and back walls and protrude outwardly therefrom. The interior surface of the side and back walls opposite from the corresponding embossed exterior surfaces are flat and uninterrupted. Thus, the interior of the drawer form 10 assumes the shape and appearance of an open-ended boxlike structure. Further, the combination of flat depressed areas and intersecting raised ribs imparts a degree of rigidity and durability not previously attained using sheet plastic material of comparable thickness.

Generally, the side and rear walls of drawer form 10 have a smooth interior surface such as shown in FIGS. 1, 4, 5 and 6. Alternatively, though, the interior surfaces of the drawer form may be embossed with a wood design 71 so that the drawer appears to be constructed from a wood material. Design 71 is best shown in FIG. 7.

Figure 2:
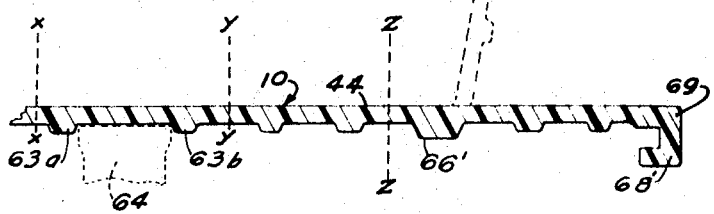
FIG. 2 is a transverse cross section of a portion of a ribbed drawer form blank showing the nonconfigured position of the wall in solid lines and the configured position of the wall in broken lines. This figure further shows the construction and arrangement of the ribs and the proper placement of a drawer guide member, shown in broken lines.

FIGS. 1 and 6 show parallel longitudinal raised, reinforcing ribs 60 in the exterior surface of the side, bottom and rear walls of drawer form 10. As shown in FIG. 2, a cross section of a portion of a nonconfigured drawer form blank 12, and FIG. 1, ribs 60 are appropriately grouped along the exterior surface of bottom 44. The first grouping, located between broken lines X—X and Y—Y, is centrally located on the exterior surface of bottom 44 and comprises a pair of parallel raised ribs 63a and 63b spaced apart a distance sufficient to permit the accommodation and retention therein of a conventional drawer guide 64, shown here in broken lines. The second grouping, located between broken line Z—Z and the terminal edge 69 of the drawer form 10, comprises a thickened, more severely raised foot 66 raised a distance exceeding that of other adjacent ribs, and an outermost expanded rib 68 formed similarly to foot 66. The distance between raised foot 66 and expanded rib 68 is varied according to the desired height of the sidewall since after configuring, the sidewall begins substantially at the base of foot 66. It should be understood, of course, that FIG. 2 shows only a portion of a drawer form blank 11. Therefore, a foot 66' and an outermost expanded rib 68' (shown in FIG. 1) similar to foot 66 and outermost rib 68 are correspondingly formed on the exterior surface of the omitted portion. FIG. 1 shows a configured plastic drawer form having the foot and rib arrangement previously described.

Feet 66 and 66' provide a surface upon which the drawer form slides in and out of a furniture cabinet. The combination of feet 66 and 66' and drawer guide 64 provides a means by which the drawer may be conveniently translated in and out of a cabinet (not shown). As previously mentioned, drawer form 10 is alternatively positioned within a cabinet by suspending the drawer form 10 from runners (not shown) which are affixed to the interior sidewalls of a cabinet and which further grasp the outer surfaces 94a and 95a of lips 94 and 95.

Between the groupings of ribs previously discussed, additional raised ribs and depressed areas are provided according to strength and durability requirements. Further, the area between the rib groupings is varied according to the overall size of the desired drawer form.

METHOD FOR FABRICATING THE PLASTIC DRAWER

Figure 8:
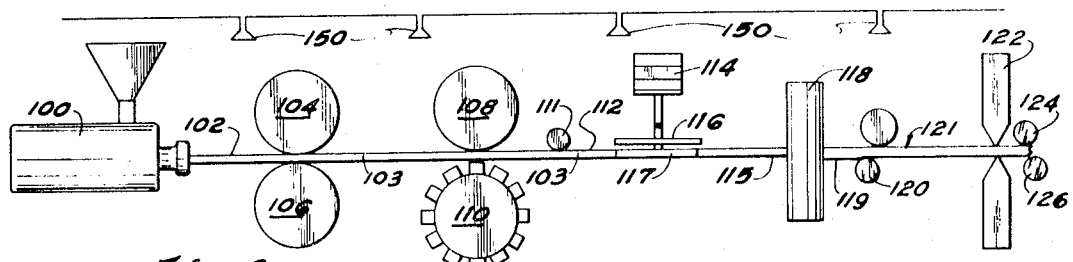
FIG. 8 is a diagrammatic view illustrating the process of forming plastic drawer form blanks including the step of embossing the exterior surface of the blank.

Referring now to FIG. 8 of the drawings, extruder 100 of conventional design, shown diagrammatically, is adapted to extrude a uniform sheet of thin plastic material 102 having a predetermined thickness and width and parallel side edges 103. In this illustration, the plastic material 102 is a suitable type of heat-softenable, thermoplastic material such as polystyrene or polyvinylchloride. The material 102 is fed between two standard calender rolls 104 and 106 where it is smoothed and expended to the final desired width and thickness. From there, the material 102 is introduced into and fed between a smooth roll 108 and an embossing roll 110 which create strengthening waffled reinforcing ribbing (such as shown in FIGS. 4 and 5) in the exterior surfaces of the sheet plastic material 102. It should be noted that neither the width nor the length of the material 102 is increased, but the apparent thickness is substantially increased. The word "apparent" seems appropriate since the flat depressed areas have a thickness slightly less than that of the nonembossed material while the raised waffle ribs have a thickness substantially greater than that of the nonembossed material. Thus, the apparent thickness of the material 102 is increased since the sheet acquires the rigidity and durability of the raised ribs and performs like a sheet of much thicker plastic material.

After emerging from between smooth roll 108 and embossing roll 110, embossed material 112 passes under print roll 111 which induces a suitable wood design into the interior surfaces of embossed material 112. Following that operation, material 112 passes beneath a notching machine 114 which, when properly activated, progressively thrusts a pair of aligned cutting blades 116 (one of which is shown) downwardly to successively notch transversely opposed side edges 103 to provide opposed pairs of notches 117 with angularly disposed edges recessed in said embossed material 112.

After being notched, the outside edges 115 of material 112 are rolled downwardly by a pair of opposed vertical rollers 118 (one of which is shown). Thereafter, the downward protrusion 110 created by vertical rollers 118 is rolled inwardly by horizontal roller 120. The action of these rollers 118 and 120 creates an elongate U-shaped lip 121 along both outside edges of material 112.

Material 112 then passes through a guillotine 122 which is adapted to progressively separate the material 112 into successive increments by transversely cutting material 112 between side edges 103 along aligned edges of opposing notches 117. Movable rollers 124 and 126 then act in a fashion similar to rollers 118 and 120 to first roll the notched edge downwardly and then inwardly to create an elongate U-shaped lip along the severed extremity of the drawer form blank 11.

The shape of the drawer form blank 11 fabricated by the method shown in FIG. 8 is best shown in FIG. 3; the design induced by print roll 111 is best shown in FIG. 7. The protruding groups of fingers 18 and 19 of FIG. 8 are alternatively created by the notching machine 114.

Figure 9:
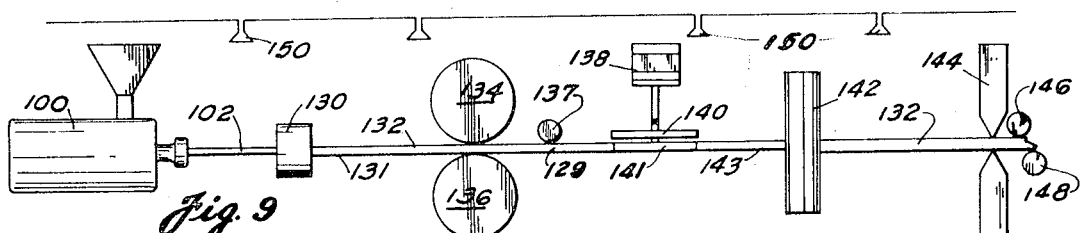
FIG. 9 is a diagrammatic view illustrating the process of forming plastic drawer form blanks including the step of forming raised ribs into the exterior surface of the blank.

Referring to FIG. 9 of the drawings, an alternative embodiment of the novel method is disclosed. A conventional extruder 100 extrudes a uniform sheet of thin plastic material 102 through a die 130 which forms material 102 into a flat sheet having parallel side edges 129 and a predetermined thickness, width and grouping of longitudinal ribs 131 along one exterior surface. The formed material 132 is then introduced into and passes between a pair of standard calender rolls 134 and 136, one of which has a surface design corresponding to and complementary with the grouping of ribs 131 created by die 130. Thus, one roller smooths and flattens one surface of the material 132 and the opposite roller smooths the opposite ribbed surface of the material while preserving the integrity of the ribs formed thereon by die 130.

After calendering, the material 132 passes under print roll 137 which induces a suitable wood design into the interior surfaces of material 132. Following that operation, material 132 passes beneath a notching machine 138, similar to notching machine 114, which, when properly activated, progressively thrusts a pair of aligned cutting blades 140 (one of which is shown) downwardly to successively notch transversely opposed side edges 129 to provide opposed pairs of notches 141 with angularly disposed edges recessed in said formed material 132.

Material 132 next passes a pair of vertical rollers 142 (one of which is shown) which roll the outside edges 143 of the material 132 downwardly. The material 132 is then progressively separated by guillotine 144 into successive increments by transversely cutting material 132 between side edges 129 along aligned edges of opposing notches 141. Rollers 146 and 148 then act in a fashion similar to rollers 124 and 126 to first roll the severed edge of the notched extremity of the drawer form blank 11 downwardly and then inwardly to create an elongate U-shaped lip therein.

FIG. 3 also shows the nonconfigured shape of the drawer form blank 11 after fabrication by the method shown in FIG. 9; the design induced by print roll 137 is best shown in FIG. 7.

Figure 10:
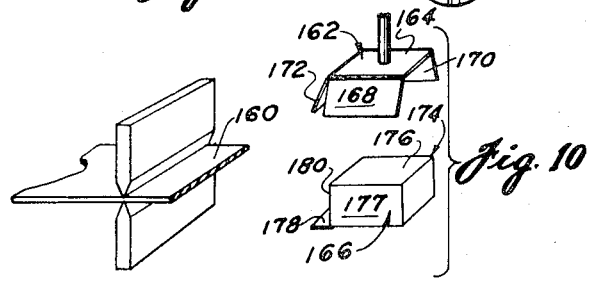
FIG. 10 is a diagrammatic perspective view illustrating the process of configuring the plastic drawer.

FIG. 10 diagrammatically shows one method of configuring drawer blanks 11 into finished drawer forms 10. This method is employed in conjunction with either the method of FIG. 8 or FIG. 9. In both of those methods, the separated material 160 forming a drawer blank 11 is placed between a configuring apparatus comprising an upper female form 162 and a lower male form 166. Female form 162 has a pair of opposed side wings 168 and 170 and a rear wing 172, each pivotally attached to a rectangular plate 164. Male form 166 comprises a rectangular receiving member 174 having an upper surface 176 coextensive with the lower surface of rectangular plate 164. Side form walls 177 (one of which is shown) of male form 166 taper outwardly so that upon configuring drawer blank 11, its sidewalls 12 and 13 taper inwardly. Male form 166 further includes flange 178 extending perpendicularly from the base of rear form wall 180. Flange 178 cooperates with rear wing 172 to remove the need for rollers 124 and 126 of FIG. 8 and 146 and 148 of FIG. 9. These rollers function in FIGS. 8 and 9 to create a back lip 96 on drawer form 10. This same back lip 96 or its equivalent is generated by the collapsing of rear wing 172 against rear wall 180 of male form 166 when material 160 is placed between male and female forms.

In the method of FIG. 10, separated but nonconfigured material 160 (drawer form blank 11) is positioned between male and female forms, 166 and 162, so that bottom wall 33 of blank 11 aligns coextensively with upper surface 176 of male form 166 and rear wall 15 extends outwardly over rear form wall 180. Rear wall 15 of material 160 should exceed the height of rear form wall 180 so that upon compression against rear form wall 180 and flange 178 a perpendicular lip 96 is generated along the upper surface of flange 178. Plate 174 is driven downwardly until bottom wall 33 is firmly secured between plate 74 and upper surface 176. Opposed side wings 168 and 170 are then driven downwardly collapsing sidewalls 12 and 13 of material 160 against side form walls 177. At substantially the same time, rear wing 172 is driven downwardly collapsing rear wall 15 against rear form wall 180. Since the height of rear wall 15 exceeds the height of rear form wall 180 a predetermined portion of rear wall 15 strikes flange 178 and is driven outwardly by the presence of flange 178 and the collapsing force of rear wing 172 until lip 96 is generated. Sidewalls 12 and 13 are then bonded to rear wall 15 in suitable fashion such as heat welding, application of plastic adhesive or mechanically securing the edges to one another by staples, screws, brads, etc. Female form 162 and male form 166 are then separated and the configured plastic drawer form 10 is removed and conveniently stacked in nesting relationship with other similarly formed plastic drawer forms.

It should be understood that during the manipulative steps of both methods herein disclosed, the temperature of the plastic material is maintained at a level suitable for shaping and configuring. This temperature control is supplied by conventional heat lamps 150 suspended over the material during the period in which fabrication of the plastic drawer takes place.

It should also be understood that while the method of the present invention comprises passing sheet material along a path parallel to the side edges of the sheet material, a machine combining several or all of these steps in one operation is also included within the inventive concept.

While an embodiment of this invention has been disclosed together with certain modifications thereof, it will be recognized that various other modifications of the invention may be made without departing from the spirit, scope and principles thereof. Such modifications should be considered as included in the hereinafter appended claims unless those claims by their language expressly state otherwise.

Having thus described the invention, what is claimed and desired to be secured by Letters Patent is:

1. A method of fabricating a plastic drawer comprising the steps of:
   extruding a continuous thin sheet of plastic having a predetermined width and thickness, opposing side edges and opposing flat faces;
   moving the plastic sheet longitudinally along a predetermined path;
   creating a plurality of raised strengthening ribs by embossing one of said opposing flat faces;
   progressively notching successive transversely opposed edge portions of said sheet to provide opposed pairs of generally rectangular notches with angularly disposed edges recessed in said sheet;
   severing successive increments of said sheet transversely between said side edges adjacent said pairs of notches to provide individual sheets;
   bending each of said sheets in the same direction along spaced longitudinally parallel lines approximately intersecting the intersection of said angularly disposed edges and along a transverse line approximately intersecting said intersection of said angularly disposed edges, sufficiently to bring the angularly disposed edges of each notch into close proximity to each other;
   bonding the proximate edges by pressing them together while at plastic bonding temperature and maintaining them under such temperature and pressure until the bond is completed;
   whereby an open-ended drawer of generally rectangular configuration is formed.

2. The method of claim 1 in which the edges of the sheet, after notching, are progressively rolled downward and then inward to provide U-shaped lips.

3. The method of claim 2 in which the severed edge extending between the notches is turned downwardly and inwardly to form a U-shaped lip corresponding to the lips on the other edges.

4. The method of claim 3 including the further step of providing a series of spaced notches in the unbonded end of each of the portions of the sheet which are bent on longitudinal lines.

5. The method of claim 4 including the further steps of providing a front closure member for the drawer of greater thickness than the remaining walls of the drawer, forming said front closure with spaced tongues corresponding to the notches of the said series, and engaging said tongues in said notches to close the front of the drawer.

* * * * *